(12) United States Patent
Tammaji et al.

(10) Patent No.: US 7,820,756 B2
(45) Date of Patent: Oct. 26, 2010

(54) POLYMERIC COMPOSITION SUITABLE FOR MANUFACTURING HEAT SEALABLE FILMS OR SHEETS

(75) Inventors: Kulkarni Sanjay Tammaji, Tamil Nadu (IN); Palaniandavar Santhana Gopala Krishnan, Tamil Nadu (IN); Dilly Raj Balasundaram, Tamil Nadu (IN)

(73) Assignee: Futura Polyesters Limited, Mumbai (IN)

( * ) Notice: Subject to any disclaimer, the term of this patent is extended or adjusted under 35 U.S.C. 154(b) by 32 days.

(21) Appl. No.: 12/284,321

(22) Filed: Sep. 19, 2008

(65) Prior Publication Data

US 2009/0082496 A1 Mar. 26, 2009

(30) Foreign Application Priority Data

Sep. 20, 2007 (IN) .................... 1837/MUM/2007

(51) Int. Cl.
*C08L 67/03* (2006.01)
(52) U.S. Cl. .................. 524/605; 524/394; 524/396; 524/434; 524/445; 524/492; 524/493
(58) Field of Classification Search ........... 524/394, 524/396, 434, 445, 492, 493, 605
See application file for complete search history.

(56) References Cited

U.S. PATENT DOCUMENTS

| 7,199,210 B2 * | 4/2007 | Kulkarni et al. ............ 528/272 |
| 2007/0167547 A1 * | 7/2007 | Tammaji et al. ............ 524/284 |
| 2009/0035502 A1 * | 2/2009 | Tammaji et al. ............ 428/36.4 |

\* cited by examiner

*Primary Examiner*—Peter Szekely
(74) *Attorney, Agent, or Firm*—Charles A. Muserlian

(57) ABSTRACT

A polymeric composition suitable for manufacturing heat sealable films or sheets comprising, polyethylene terephthalate (PET) to the extent of about 80% to 95% by mass of the total composition; a polymer additive for lowering the melting point of the composition selected from Polyethylene Naphthalate (PEN), Polytrimethylene Naphthalate (PTN), in-situ formed Polyethylene Naphthalate (PEN) and in situ formed Polytrimethylene Naphthalate (PTN) to the extent of about 20% to 5% by mass of the total composition; a nucleating agent to the extent of about 200 to 1500 ppm by mass of the composition; a polycondensation catalyst to the extent of about 30 to 300 ppm by mass of the composition; a clear fast reheat (CFRH) additive to the extent of about 10 to 30 ppm by mass of the composition; a color toner to the extent of about 0.75 to 25 ppm by mass of the composition; and a heat stabilizer to the extent of about 20 to 55 ppm by mass of the composition.

23 Claims, No Drawings

POLYMERIC COMPOSITION SUITABLE FOR MANUFACTURING HEAT SEALABLE FILMS OR SHEETS

FIELD OF INVENTION

The present invention relates to a resin compositions.

In particular, this invention relates to resin compositions for manufacturing heat sealable top layer film or sheet for sealing containers.

BACKGROUND

In packaging food materials oriented polyester films "OPET" (Orientd PET) as pouches or thermoformed dual ovenable trays made from "CPET" (Crystalline PET) are nowadays very common. The use of such polyester containers need a cover, lid or seal which can both seal the container to prevent leakage of the contents during storage and as well protect the contents from external atmosphere. The top layer or seal should be easily peeled without tear from the container. The lid or seal normally comprises a flexible composite polymeric film consisting of a base polymer layer and a sealable layer of another polymer or a coating layer of another polymer. A strong seal with easy peeling properties is required at both low, e.g ambient and high temperatures. Also the heat seal layer should be transparent, haze free and optically clear.

However, heat sealing of PET containers is extremely difficult in comparison with other plastic containers, such as those from HDPE, PP and PVC, because of PET has high melting point of ~260° C. and its reasonably fast crystallization rates at temperature between 100 to 240° C. This makes the heat sealing process difficult and if forcibly sealed at high temperatures, the material becomes brittle due to crystallization and polymer degradation. Thus it becomes important to inhibit crystallization of the polyester composition at the time of heat sealing in order to increase the strength of the heat seal.

Existing Knowledge:

Polyester resins for heat sealable films are known as early as from 1970s. U.S. Pat. No. 4,020,141 discloses the method of making heat-sealable, heat shrinkable, biaxially oriented polyester film wherein the polymer consisted primarily of PET with additional monomeric units selected from a second acid or a second glycol.

EP 0035835 deals with polymer film composites with a primary layer comprising an oriented layer of first linear polyester and a heat sealable secondary layer adherent to the primary layer which comprises essentially amorphous second linear polyester. It also states that the preferred polyester resin is an amorphous copolyester resin comprising PET and PIA (polyethylene isophthalate) or hexahydroterephthalic acid based co polyester with a preferred composition of PET:PIA as 80:20.

U.S. Pat. No. 4,765,999 discloses multilayer non oriented heat sealable films with a base substrate layer of PET or its co polymer and a heat sealable surface layer of copolyester consisting of DEG or PETG.

JP Patent 63202429 discloses a polyester shrink film with excellent heat sealing property. Here the polyester composition constituted PET as the major component and 3-50 mole % of neopentyl glycol as the glycol modifier.

JP Patent 1165627 discloses with a polyester sheet for heat sealing thermoformed objects and the polyester resin comprised PET with 1-15 parts by weight of a block co polyester of PBT and poly tetramethylene glycol and 2-20 parts by weight of PP resin.

EP 0379190 discloses a laminated polyester film with excellent heat sealing ability consisting of a base polyester layer and a heat sealing layer. The resin composition used in the heat-sealing layer comprises either glycol modified polyester or a dicarboxylic acid modified polyester which includes acids like adipic acid, azelaic acid, isophthalic acid etc. It also gives data on sealing energy, antiblocking property etc.

U.S. Pat. No. 5,484,632 discloses a non oriented heat sealing polyester film PET, EG and 7-15 mole % of CHDM, a glycol modifier.

WO 9619333 discloses a polyester based film with a substrate layer and a coating layer containing copolyester of aliphatic or aromatic dicarboxylic acid, which includes isophthalic acid, along with at least one polyalkylene glycol. The film is suitable for use as a lid for a container with strong heat sealing and easy peeling property.

U.S. Pat. No. 5,721,028 discloses heat-sealed closure for polyester container. The closure composed of a laminate of a heat seal layer comprising mainly a copolyester resin modified with aliphatic or aromatic dicarboxylic acids or glycol modified co polyesters.

U.S. Pat. No. 5,955,181 discloses an invention of a co-extruded heat-sealable polyester film wherein the heat sealable outer layer comprises a copolymer containing 5 to 95% by weight of ethylene 2,6-naphthalate units.

U.S. Pat. No. 5,972,445 discloses a multilayer polyester sheet with a base layer comprising a polyester resin and a sealing layer comprising a polyester resin with a Tg less than that of the base layer by at least 5° C. The sealing layer co polyesters are modified by NDC or IPA or DEG or CHDM or neopentyl glycol.

U.S. Patent Application 20020015835 discloses sealable polyester film comprising modified co polyesters with NDC, cycloaliphatic or aromatic diols and/or dicarboxylic acids.

U.S. Pat. No. 6,623,821 discloses a packaging film comprising heat sealable polyester film comprising a homopolymers or copolymer of PET and coated with a solvent bases heat seal coating of amorphous co polyester. The amorphous heat sealing copolyester has a composition consisting of PET and other diacid like succinic acid, isophthalic acid etc.

U.S. Pat. No. 6,902,802 discloses a heat-sealable polyester composition preferably containing a mixture of PET and PTT as homopolymers or copolymers, either as a physical blend or as a copolyester by in-situ preparation and claiming the composition's capability of heat-sealing at low temperatures with barrier properties and non-flavor scalping.

U.S. Patent application 20050061708 discloses a co-extruded heat sealable and peelable polyester film having high peeling resistance. The film comprises a base layer and a heat sealable top layer. The polymer of the heat sealable layer has a melting point of <190 to 230° C. and is a co polyester composed of units derived from aliphatic or aromatic dicarboxylic acids U.S. Patent application 20050249906 discloses a process for the production of coated heat sealable polymeric film. The heat sealable layer consists of co-polyester with repeat units of one or more aliphatic or aromatic dicarboxylic acids whose concentration ranges from 40 to 70 mole %.

OBJECTS OF THE PRESENT INVENTION

It is an object of the present invention to provide a process of manufacturing Co-polyester based resin composition which is an ecosubstitute to PVC and a cost effective substitute to PETG resin.

Another object of the present invention is to provide copolyester resin composition suitable for making heat sealable film or sheet.

Yet another object of the invention is to provide copolyester resin which has sufficient seal strength at ambient and high temperatures as well as subzero temperatures.

Yet another object of the invention is to provide co-polyester resin which has improved barrier properties.

Yet another object of the invention is to provide co-polyester resin for making heat sealable film or sheet that is easily peelable without tearing from the container.

Still another object of the invention is to provide co-polyester resin which gives clear and haze free film or sheet.

Still further object of the invention is to provide co-polyester resin which prevents the sagging of the film or sheet during the extrusion.

Yet another object of the present invention is to develop a copolyester which is easy to process without formation of lumps.

One more object of the present invention is to provide a copolyester resin having greater sealing strength when compared to PVC and additionally has the advantage of having reduced sealing time and temperature when compared to that of PVC/PETG.

Yet another object of the present invention is to provide a process, either as a batch or continuous, for manufacturing a copolyester resin either with PTA or DMT as one of the raw materials.

One more object of the present invention is to provide a copolyester resin composition for making the heat sealable film or sheet, sealing being affected by thermal, pressure, ultrasonic or radio frequency means method and a process for making such a composition.

SUMMARY OF THE INVENTION

In accordance with this invention there is provided a polymeric composition suitable for manufacturing heat sealable films or sheets comprising:
a. polyethylene terephthalate (PET) to the extent of about 80% to 95% by mass of the total composition;
b. a polymer additive for lowering the melting point of the composition selected from Polyethylene Naphthalate (PEN), Polytrimethylene Naphthalate (PTN), in-situ formed Polyethylene Naphthalate (PEN) and in situ formed Polytrimethylene Naphthalate (PTN) to the extent of about 5% to 20% by mass of the total composition;
c. a nucleating agent to the extent of about 200 to 1500 ppm by mass of the composition;
d. a polycondensation catalyst to the extent of about 30 to 300 ppm by mass of the composition;
e. a clear fast reheat (CFRH) additive to the extent of about 10 to 20 ppm by mass of the composition;
f. a color toner to the extent of about 0.75 to 25 ppm by mass of the composition; and
g. a heat stabilizer to the extent of about 20 to 55 ppm by mass of the composition.

Typically, the polyester component contains 0 to 100% post consumed recycled Polyethylene Terephthalate (PCR-PET).

Typically, the nucleating agent is at least one nucleating agent selected from a group of nucleating agents consisting of Nyacol silica, Nano clay, sodium stearate, sodium benzoate, sodium acetate, potassium stearate, potassium benzoate, sorbitol based chemicals, micronized sodium benzoate, micronized potassium benzoate, micronized sodium stearate and micronized potassium stearate.

Typically, the nucleating agent is Nyacol Silica.

Typically, the nucleating agent is Nano Clay.

In accordance with one preferred embodiment of the invention, nucleating agent is a mixture of Nyacol Silica (colloidal silica) and Nano clay.

Typically, the polycondensation catalyst is at least one polycondensation catalyst selected from a group of polycondensation catalysts consisting of antimony, titanium, manganese and germanium based compounds.

Typically, the polycondensation catalyst is Antimony Trioxide.

Typically the polycondensation catalyst is Potassium Titanium Oxide Oxalate.

Typically, the polycondensation catalyst is Manganese acetate.

Typically, the polycondensation catalyst is Germanium dioxide.

Preferably, the clear fast reheat (CFRH) additive is Tungsten Trioxide.

Typically, the color toner is at least one color toner selected from a group of color toners consisting of cobalt acetate, red toner powder and Blue toner powder.

Typically, the heat stabilizer is at least one heat stabilizer selected from a group of heat stabilizers consisting of triethylphosphono acetate, orthophosphoric acid and 2,6-di-tert-butylphenol.

Typically, the antiblocking agent is at least one antiblocking agent selected from a group of antiblocking agents consisting of silica, zeolite and talc.

In accordance with the present invention a heat sealable film or sheet having a polymeric composition is obtained.

In accordance with another embodiment of the invention a method for making copolyester resin meant for manufacture of heat sealable films or sheets comprises the following steps:
a. mixing virgin terephthalic acid, monoethylene glycol in paste optionally with PCRPET, and isophthalic acid in an esterification reactor and adding nucleating agent, polycondensation catalyst, color toners and heat stabilizers;
b. carrying out the esterification reaction at a temperature between 245 and 265° C. to obtain a prepolymer;
c. adding clear fast reheat (CFRH) additive to the prepolymer;
d. transferring an esterified prepolymer to the polyreactor;
e. adding a polymer additive for lowering the melting point of the composition selected from Polyethylene Naphthalate (PEN), Polytrimethylene Naphthalate (PTN), in-situ formed Polyethylene Naphthalate (PEN) and in-situ formed Polytrimethylene Naphthalate (PTN);
f. subjecting the prepolymer containing the polymer additive to polycondensation at a temperature of 265 to 284° C. to obtain a molten amorphous polymer;
g. extruding molten amorphous polymer to form chips;
h. drying and pre-crystallizing the amorphous chips; and
i. subjecting the resultant chips to solid state polymerisation to attain an I.V. greater than 0.55 dL/gm.

In accordance with one of the preferred embodiment of the present invention depolymerized PCRPET is used.

Preferably, the depolymerized PCRPET is prepared by depolymerization of PCRPET with MEG at a temperature of 235° C. for about 60 min. under 3.5 bar gauge pressure.

In accordance with this invention there is also provided a method for making heat sealable films or sheets comprising the step of subjecting said copolyester composition to extrusion to form heat sealable films or sheets.

In accordance with the process as mentioned herein above a heat sealable top layer film or sheet for sealing containers like thermoformed CPET is made.

DETAILED DESCRIPTION OF THE INVENTION

In recent years great attention has been given to the development of various polymeric containers for storage of food stuffs and the like. Polyesters are the most common materials used for packaging food stuff and beverages. Such polyester containers need a seal, lid or cover to prevent the leakage of the contents as well as to protect the contents from the external atmosphere. But because of the high melting point of the PET and reasonably faster crystallization rates, heat sealing process becomes difficult and the material turns brittle due to fast crystallization.

The present invention envisages the manufacture of PET-PEN/PTN copolyester resin composition suitable for making optically clear heat sealable film or sheet with sufficient seal strength for monolayer or for multilayer applications. Furthermore, present invention also provides copolyester resin composition which prevents or reduce the crystallization tendency in the heat sealable film or sheet such that the film or sheet does not degrade during the heat sealing with time and temperature.

The present invention also provides the addition of polymer additive to said resin composition which helps in lowering the melting point of the composition thereby facilitating the heat sealing of the film or sheet at sufficiently lower temperature.

Accordingly, there is provided a polymer composition for making heat sealable films or sheets comprises a polyethylene terephthalate (PET) to the extent of 80% to 95% by mass of the total composition, a polymer additive for lowering the melting point of the composition selected from Polyethylene Naphthalate (PEN), Polytrimethylene Naphthalate (PTN), in-situ formed Polyethylene Naphthalate (PEN) and in situ formed Polytrimethylene Naphthalate (PTN) to the extent of 5% to 20% by mass of the total composition, a nucleating agent to the extent of 200 to 1500 ppm by mass of the composition, a polycondensation catalyst to the extent of 30 to 300 ppm by mass of the composition, a clear fast reheat (CFRH) additive to the extent of 10 to 20 ppm by mass of the composition, a color toner to the extent of 0.75 to 25 ppm by mass of the composition and a heat stabilizer to the extent of 20 to 55 ppm by mass of the composition.

In accordance with one of the preferred embodiment of the present invention, the polyester component also contains 0 to 100% post consumed recycled Polyethylene Terephthalate (PCRPET).

In accordance with this invention the additives are added to the copolyester during melt polymerization at different stages like esterification, prepolymerization or polycondensation.

The nucleating agent used in the present invention is at least one nucleating agent selected from a group of nucleating agents consisting of Nyacol silica, Nano clay, sodium stearate, sodium acetate, potassium stearate, potassium benzoate, sorbitol based chemicals, micronized sodium benzoate, micronized potassium benzoate, micronized sodium stearate and micronized potassium stearate.

In accordance with one preferred embodiment of the invention, the nucleating agent is Nyacol Silica. In accordance with another embodiment of the invention, the nucleating agent is Nano clay. In accordance with preferred embodiment of the invention, the nucleating agent is a mixture of Nyacol silica (colloidal silica) and Nano clay.

The polycondensation catalyst used in the present invention is at least one selected from a group of polycondensation catalysts consisting of antimony, titanium, manganese and germanium based compounds. The polycondensation catalyst can either be antimony trioxide or potassium titanium oxide oxalate or germanium dioxide. Alternatively, the polycondensation catalyst can be manganese acetate.

In accordance with the present clear fast reheat additives typically but not limited to tungsten, tungsten trioxide, tungsten carbide, molybdenum oxide. Preferably, the clear fast reheat (CFRH) additive is tungsten Trioxide in the range of 10 to 30 ppm by mass of the composition.

In accordance with present invention, the color toner is at least one color toner selected from a group of color toners consisting of cobalt acetate, red toner powder and Blue toner powder.

The heat stabilizer used in the present invention is at least one heat stabilizer selected from a group of heat stabilizers consisting of triethylphosphono acetate, orthophosphoric acid and 2,6-di-tert-butylphenol.

The antiblocking agent used in the present invention is at least one antiblocking agent selected from a group of antiblocking agents consisting of silica, zeolite and talc.

In accordance with the present invention a heat sealable film or sheet having a polymeric composition is obtained.

In accordance with the present invention, there is also provided a method for making copolyester resin composition meant for manufacture if heat sealable films or sheets.

A paste of virgin terephthalic acid, monoethylene glycol and isophthalic acid is mixed in an esterification reactor. The additives such as Cobalt Acetate, Red Toner powder, Blue Toner powder as Color improving additives and toners, Germanium based catalyst as a suspension, and Nyacol consisting of 30% silica by weight in MEG as a suspension are added to the esterification reactor. The esterification reaction is carried out at a temperature of 2450° C. and 265° C. to obtain a prepolymer. After the completion of the esterification reaction, heat stabilizers like triethylphosphono acetate (TEPA) followed by 165 g of orthophosphoric acid (OPA) are added to the esterifier. Tungsten based clear fast reheat (CFRH) is also added to the prepolymer and held for 5 minutes. Then the prepolymer with all the additives is transferred via a 20 micron filter to the polycondensation reactor or autoclave. A polymer additive for lowering the melting point of the composition selected from Polyethylene Naphthalate (PEN), Polytrimethylene Naphthalate (PTN), in-situ formed Polyethylene Naphthalate (PEN) and in-situ formed Polytrimethylene Naphthalate (PTN) is added to the polycondensation reactor to autoclave and held for 10 minutes for temperature stabilization of 265° C. The prepolymer along with polymer additive is subjected to the polycondensation at a temperature of 265 to 284° C. to obtain a molten amorphous polymer with a peak temperature of 288° C. to achieve the required I.V. in the melt. After reaching the required I.V. the amorphous co polyester resin melt is extruded out as strands and cut under water and collected as amorphous chips. These amorphous chips are then dried and pre-crystallized and the resultant chips are then subjected to solid state polymerization (SSP) for increasing the I.V. beyond ~0.55.

In accordance with one embodiment of the invention process for making the copolyesters for different applications is done by using different comonomers like isophthalic acid, naphthalene dicarboxylic acid, methyl propanediol, propanediol, butanediol and Neopentyl glycol.

In accordance with another embodiment of the invention, a process for making the copolyester resin composition is done by adding depolymerized PCRPET (of different % levels) to the resin composition. The depolymerized PCRPET is prepared by depolymerization of PCRPET with MEG at a temperature of 235° C. for about 60 min. under 3.5 bar gauge pressure.

In another aspect of this invention, there is provided a method for making heat sealable films or sheets comprising the step of subjecting copolyester composition containing the additives to extrusion to form heat sealable films or sheets.

In still another aspect of this invention there is provided a heat sealable top layer film or sheet for sealing containers like thermoformed CPET made in accordance with the process as mentioned herein above.

Technical Advancement:

Due to the addition of polymer additive like PEN/PTN into the polymer composition, heat sealing of the films or sheets can be achieved at lower temperatures thereby preventing the degradation of the material. The naphthalene moiety also imparts UV barrier and heat resistance to the heat seal film. The incorporation of the PTN additionally provides resistance to gas permeation.

The addition of nano additives like nano silica/nano clay helps in marginally improving the crystallinity as well as barrier property. It also prevents chips agglomeration thereby facilitating drying without lump formation.

The addition of antiblocking agent in the heat seal film application avoids sticking and facilitates trouble free unwinding of the heat seal film roll.

The invention will now be described with the help of the following non-limiting examples.

EXAMPLE 1

184 kg of IPA (8% on copolyester or batch weight) calculated on the basis of 2300 kg, which excludes the naphthalate comonomer), along with 80 kg of MEG were taken in the Esterification reactor. Appropriate quantities of PTA and MEG for a 2300 kg of PET batch were made into a paste and fed to the Esterification reactor. In the present example 1803 kg of PTA and 919 kg of MEG were used for a PTA:MEG mole ratio of 1:1.07. 146.2 g of Cobalt Acetate powder, 3.45 g of Red Toner powder, 2.88 g of Blue Toner powder as Color improving additives and toners, 994 g of Germanium dioxide based catalyst as a suspension, and 460 g of Nyacol consisting of 30% nano silica by weight in MEG as a suspension were added to the esterification reactor. Esterification was carried out between 245 and 265° C. After the completion of esterification 852 g of heat stabilizer i.e. triethylphosphono acetate (TEPA) followed by 165 g of orthophosphoric acid (OPA) were added to the esterifier. Prior to the transfer of the prepolymer formed to the poly reactor 27.6 g of tungsten trioxide, a clear fast reheat (CFRH) additive was added and held for 5 minutes. The prepolymer with all the additives was transferred via a 20 micron filter to the polycondensation reactor or autoclave. 115 kg (5 weight % on 2300 kg) of amorphous PEN chips of intrinsic viscosity (I.V.) between 0.45 and 0.55 dL/g were added to the poly reactor and held for 10 minutes for temperature stabilization i.e 265° C. Polymerization was conducted between 265 and 284° C. with a peak temperature of 288° C. to achieve the required I.V. in the melt. After reaching the required I.V. the amorphous co polyester resin melt was extruded out as strands and cut under water and collected as amorphous chips. These amorphous chips were dried and pre-crystallized before subjecting to solid state polymerization (SSP) for increasing the I.V. beyond ~0.55 obtained in the amorphous melt.

Table 1 gives the details of the raw materials and additives for a typical commercial batch.

Table 2 gives the important properties of the amorphous and SSP chips of the co polyester resin.

TABLE 1

Raw Materials and Additives for a 2300 kg Batch of Co Polyester Resin Additives are based on 2300 kg batch weight excluding the addition of PEN

| Sr. No. | Raw Materials/ Additives | Quantity | Unit | ppm or % |
|---|---|---|---|---|
| 1. | PTA | 1803 | kg | — |
| 2. | MEG | 919 | kg | — |
| 3. | IPA | 184 | kg | 8.0 wt. % on copolyester or batch weight |
| 4. | PEN | 115 | kg | 5.0 wt. % on copolyester or batch weight |
| 5. | $Sb_2O_3$ catalyst | 345 | g | 150 ppm as Sb |
| 6. | Cobalt Acetate | 146.2 | g | 15 ppm |
| 7. | RT - Powder | 3.45 | g | 1.5 ppm |
| 8. | BT - Powder | 2.88 | g | 1.25 |
| 9. | Germanium dioxide based Catalyst as a suspension | 994 | g | 30 ppm |
| 10. | Nyacol Silica | 460 | g | 200 ppm |
| 11. | TEPA | 852 | g | 50 ppm as P |
| 12. | OPA | 165 | g | 20 ppm as P |
| 13. | Tungsten Trioxide | 27.6 | g | 12 ppm |

TABLE 2

Properties of Amorphous and SSP Copolyester Resin

| PARAMETERS | AMORPHOUS | SSP |
|---|---|---|
| I.V. dL/g | 0.55 ± 0.01 | 0.800 ± 0.01 |
| L* | Min. 78 | Min. 83 |
| a* | −1.0 ± 0.2 | −1.2 ± 0.2 |
| b* | −7.0 ± 0.5 | −3.5 ± 0.5 |
| Tm | 228 ± 2° C. | 228 ± 2° C. |
| Tg | ~74° C. | ~77° C. |
| COOH, meq/kg | Max. 35 | Max. 30 |
| DEG wt. % | Max. 1.5 | Max. 1.5 |

EXAMPLE 2

Example-2 was repeated as process described in Example-1 with the changes in recipe as given in Table-3 (Standard PTA route). Here PEN is not used when compared to Example 1. Also Titanium catalyst is used instead of germanium dioxide.

TABLE 3

Raw Materials and Additives for a 10 kg Batch Weight of Co Polyester Resin
Additives are based on 10 kg batch weight

| Sr. No. | Raw Materials/Additives | Quantity | Unit | ppm or % | Addition Point |
|---|---|---|---|---|---|
| 1. | PTA | 7.850 | kg | — | Initial |
| 2. | MEG | 3.714 | kg | — | Initial |
| 3. | IPA | 0.8 | kg | 8% on batch weight | Initial |
| 4. | $Sb_2O_3$ catalyst | 2.0 | g | 200 ppm as Sb | Initial |
| 5. | Cobalt Acetate | 1.06 | g | 25 ppm as Co | Initial |
| 6. | RT - Powder | 0.01 | g | 1.0 ppm | Initial |
| 7. | BT - Powder | 0.008 | g | 0.75 ppm | Initial |
| 8. | Nyacol Silica | 2 | g | 200 ppm | Initial |
| 9. | OPA | 1.08 | g | 30 ppm as P | After Esterification |
| 10. | Potassium Titanium Oxide Oxalate Catalyst | 0.519 | g | 7 ppm | After Esterification |
| 11. | Tungsten Trioxide | 0.12 | g | 12 ppm | After Esterification |

TABLE 4

Properties of Amorphous and SSP Copolyester Resin

| PARAMETERS | AMORPHOUS | SSP |
|---|---|---|
| I.V. dL/g | 0.55 ± 0.01 | 0.801 ± 0.01 |
| L* | 76 min. | 81 min. |
| a* | −0.8 ± 0.2 | −1.2 ± 0.2 |
| b* | −6.0 ± 0.5 | −2.5 ± 0.5 |
| Tm ° C. | 228 ± 1 | 225 ± 1 |
| Tm ° C. | ~77 | ~77 |
| COOH, meq/kg | 22 max | 7 max |
| DEG wt. % | 1.5 max | 1.5 max |

EXAMPLE 3

Example-3 was repeated as described in Example-1 with the changes in recipe as given in Table-5 (High I.V. DMT route)

TABLE 5

Raw Materials and Additives for a 10 kg Batch Weight of Copolyester Resin
Additives are based on 10 kg batch weight

| Sr. No. | Raw Materials/Additives | Quantity | Unit | ppm or % | Addition Point |
|---|---|---|---|---|---|
| 1. | DMT | 8.860 | kg | — | Initial |
| 2. | MEG | 3.568 | kg | — | Initial |
| 3. | IPA | 0.8 | kg | 8% on batch weight | Initial |
| 4. | Ester Interchange Catalyst, Manganese Acetate | 3.0 | g | 300 ppm as Mn | Initial |
| 5. | $Sb_2O_3$ catalyst | 2.0 | g | 200 ppm as Sb | Initial |
| 6. | Cobalt Acetate | 1.06 | g | 25 ppm as Co | Initial |
| 7. | RT - Powder | 0.01 | g | 1.0 ppm | Initial |
| 8. | BT - Powder | 0.008 | g | 0.75 ppm | Initial |
| 9. | Nyacol Silica | 2 | g | 200 ppm | Initial |
| 10. | OPA | 1.08 | g | 30 ppm as P | After Esterification |
| 11. | Potassium Titanium Oxide Oxalate Catalyst | 0.519 | g | 7 ppm | After Esterification |
| 12. | IPA Master Batch-65% | 1.23 | kg | | After Esterification |
| 13. | Tungsten Trioxide | 0.12 | g | 12 ppm | After Esterification |

TABLE 6

Properties of Amorphous and SSP Copolyester Resin

| PARAMETERS | AMORPHOUS | SSP |
|---|---|---|
| I.V. dL/g | 0.550 ± 0.01 | 1.200 ± 0.01 |
| L* | 76 min | 81.0 min |
| a* | −0.8 ± 0.2 | −1.9 ± 0.01 |
| b* | −6.0 ± 0.5 | −1.1 ± 0.5 |
| Tm ° C. | 228 ± 2 | 224.0 ± 2 |
| Tg ° C. | 77 ± 1 | 77 ± 1 |
| COOH, meq/kg | 22 max | 5 max |
| DEG wt. % | 1.5 max | 1.5 max |

EXAMPLE 4

Example-4 was repeated as described in Example-1 with the changes in recipe as given in Table-7 (Addition of PEN as chips). Similar results were obtained when PEN chips were replaced with appropriate quantities of NDC or NDA to form in-situ PEN in the system.

TABLE 7

Raw Materials and Additives for a 10 kg Batch Weight of Co Polyester Resin
Additives are based on 10 kg batch weight

| Sr. No. | Raw Materials/Additives | Quantity | Unit | ppm or % | Addition Point |
|---|---|---|---|---|---|
| 1. | PTA | 7.414 | kg | — | Initial |
| 2. | MEG | 3.528 | kg | — | Initial |
| 3. | IPA | 0.8 | kg | 8% on batch weight | Initial |
| 4. | PEN Chips | 0.5 | kg | 5% | After Esterification |
| 5. | $Sb_2O_3$ catalyst | 2.0 | g | 200 ppm as Sb | Initial |
| 6. | Cobalt Acetate | 1.06 | g | 25 ppm as Co | Initial |
| 7. | RT - Powder | 0.01 | g | 1.0 ppm | Initial |
| 8. | BT - Powder | 0.008 | g | 0.75 ppm | Initial |
| 9. | Nyacol Silica | 2 | g | 200 ppm | Initial |
| 10. | OPA | 1.08 | g | 30 ppm as P | After Esterification |
| 11. | Potassium Titanium Oxide Oxalate Catalyst | 0.519 | g | 7 ppm | After Esterification |
| 12. | Tungsten Trioxide | 0.12 | g | 12 ppm | After Esterification |

TABLE 8

Properties of Amorphous and SSP Copolyester Resin

| PARAMETERS | AMORPHOUS | SSP |
|---|---|---|
| I.V. dL/g | 0.538 ± 0.01 | 0.810 ± 0.01 |
| L* | 76.0 min | 82.0 min |
| a* | −1.4 ± 0.2 | −1.9 ± 0.2 |
| b* | −5.5 ± 0.5 | −2.2 ± 0.5 |
| Tm ° C. | 222 ± 2 | 219 ± 2 |
| Tg ° C. | 78 ± 1 | 78 ± 1 |
| COOH, meq/kg | 23 max 25 | 8 max 15 |
| DEG wt. % | 1.28 max 1.5 | 1.31 max 1.5 |

EXAMPLE 5

Example-5 was repeated as described in Example-1 with the changes in recipe as given in Table-9 (Addition of PTN as chips). Similar results were obtained when PTN chips were replaced with appropriate quantities of NDC or NDA and PDO to form in-situ PTN in the system.

TABLE 9

Raw Materials and Additives for a 10 kg Batch Weight of Copolyester Resin
Additives are based on 10 kg batch weight

| Sr. No. | Raw Materials/Additives | Quantity | Unit | ppm or % | Addition Point |
|---|---|---|---|---|---|
| 1. | PTA | 7.5 | kg | — | Initial |
| 2. | MEG | 3.565 | kg | — | Initial |
| 3. | IPA | 0.8 | kg | 8% on PET | Initial |
| 4. | PTN Chips | 0.4 | kg | 4% | After Polycondensation |
| 5. | $Sb_2O_3$ catalyst | 2.0 | g | 200 ppm as Sb | Initial |
| 6. | Cobalt Acetate | 1.06 | g | 25 ppm as Co | Initial |
| 7. | RT - Powder | 0.01 | g | 1.0 ppm | Initial |
| 8. | BT - Powder | 0.008 | g | 0.75 ppm | Initial |
| 9. | Nyacol Silica | 2 | g | 200 ppm | Initial |
| 10. | OPA | 1.08 | g | 30 ppm as P | After Esterification |
| 11. | Potassium Titanium Oxide Oxalate Catalyst | 0.519 | g | 7 ppm | After Esterification |
| 12. | Tungsten Trioxide | 0.12 | g | 12 ppm | After Esterification |

TABLE 10

Properties of Amorphous and SSP Copolyester Resin

| PARAMETERS | AMORPHOUS | SSP |
|---|---|---|
| I.V. dL/g | 0.529 ± 0.1 | 0.805 ± 0.1 |
| L* | 75.5 min 75 | 81.9 min 81 |
| a* | −1.5 ± 0.2 | −1.8 ± 0.2 |
| b* | −5.3 ± 0.5 | −2.3 ± 0.5 |
| Tm ° C. | 222 ± 2 | 218 ± 2 |
| Tg ° C. | 77 ± 1 | 77 ± 1 |
| COOH, meq/kg | max 25 | max 12 |
| DEG wt. % | max 1.5 | max 1.5 |

EXAMPLE 6

Example 6 was repeated as described in Example-1 with the changes in recipe as given in Table-11 (Addition of Nano-clay/Nano Silica)

TABLE 11

Raw Materials and Additives for a 10 kg Batch Weight of Co Polyester Resin
Additives are based on 10 kg batch weight

| Sr. No. | Raw Materials/Additives | Quantity | Unit | ppm or % | Addition Point |
|---|---|---|---|---|---|
| 1. | PTA | 7.85 | kg | — | Initial |
| 2. | MEG | 3.714 | kg | — | Initial |
| 3. | IPA | 0.8 | kg | 8% on batch weight | Initial |
| 4. | $Sb_2O_3$ catalyst | 2.0 | g | 200 ppm as Sb | Initial |
| 5. | Cobalt Acetate | 1.06 | g | 25 ppm as Co | Initial |
| 6. | RT - Powder | 0.01 | g | 1.0 ppm | Initial |
| 7. | BT - Powder | 0.008 | g | 0.75 ppm | Initial |
| 8. | Nyacol Silica | 2 | g | 200 ppm | Initial |
| 9. | Nano Clay | 1.0174 | g | 1500 ppm | Initial |
| 10. | OPA | 1.08 | g | 30 ppm as P | After Esterification |
| 11. | Potassium Titanium Oxide Oxalate Catalyst | 0.519 | g | 7 ppm | After Esterification |
| 12. | Tungsten Trioxide | 0.12 | g | 12 ppm | After Esterification |

TABLE 12

Properties of Amorphous and SSP Copolyester Resin

| PARAMETERS | AMORPHOUS | SSP |
|---|---|---|
| I.V. dL/g | 0.553 | 0.790 |
| L* | 73.1 | 78.4 |
| a* | −1.3 | −1.6 |
| b* | −4.3 | −1.5 |
| Tm ° C. | 227 | 224 |
| Tg ° C. | 75.8° C. | 75.9° C. |
| COOH, meq/kg | 24 | 10 |
| DEG wt. % | 1.46 | 1.48 |

EXAMPLE 7

Example 7 was repeated as described in Example-1 with the changes in recipe as given in Table-13 (Addition of Anti-blocking Agent)

TABLE 13

Raw Materials and Additives for a 10 kg Batch Weight of Copolyester Resin
Additives are based on 10 kg batch weight

| Sr. No. | Raw Materials/Additives | Quantity | Unit | ppm or % | Addition Point |
|---|---|---|---|---|---|
| 1. | PTA | 7.85 | kg | — | Initial |
| 2. | MEG | 3.71 | kg | — | Initial |
| 3. | IPA | 0.8 | kg | 8% on batch weight | Initial |
| 4. | $Sb_2O_3$ catalyst | 2.0 | g | 200 ppm as Sb | Initial |
| 5. | Cobalt Acetate | 1.06 | g | 25 ppm as Co | Initial |
| 6. | RT —Powder | 0.01 | g | 1.0 ppm | Initial |
| 7. | BT —Powder | 0.008 | g | 0.75 ppm | Initial |
| 8. | Nyacol Silica | 2 | g | 200 ppm | Initial |
| 9. | Antiblocking Agent | 187.5 | g | 1500 ppm | Initial |
| 10. | OPA | 1.08 | g | 30 ppm as P | After Esterification |
| 11. | Potassium Titanium Oxide Oxalate Catalyst | 0.519 | g | 7 ppm | After Esterification |
| 12. | Tungsten Trioxide | 0.12 | g | 12 ppm | After Esterification |

TABLE 14

Properties of Amorphous and SSP Copolyester Resin

| PARAMETERS | AMORPHOUS | SSP |
|---|---|---|
| I.V. dL/g | 0.590 | 0.802 |
| L* | 73.8 | 78.1 |
| a* | −1.2 | −1.7 |
| b* | −4.9 | −1.8 |
| Tm ° C. | 226 | 223 |
| Tg ° C. | 76.7° C. | 76.2° C. |
| COOH, meq/kg | 24 | 7 |
| DEG wt. % | 1.5 | 1.51 |

EXAMPLE 8

Example 8 was repeated as described in Example-1 with the changes in recipe as given in Table-15 (Addition of MPDiol)

TABLE 15

Raw Materials and Additives for a 10 kg Batch Weight of Copolyester Resin
Additives are based on 10 kg batch weight

| Sr. No. | Raw Materials/ Additives | Quantity | Unit | ppm or % | Addition Point |
|---|---|---|---|---|---|
| 1. | PTA | 8.65 | kg | — | Initial |
| 2. | MEG | 3.32 | kg | — | Initial |
| 3. | $Sb_2O_3$ catalyst | 2.0 | g | 200 ppm as Sb | Initial |
| 4. | Cobalt Acetate | 1.06 | g | 25 ppm as Co | Initial |
| 5. | RT - Powder | 0.01 | g | 1.0 ppm | Initial |
| 6. | BT - Powder | 0.008 | g | 0.75 ppm | Initial |
| 7. | Nyacol Silica | 2 | g | 200 ppm | Initial |
| 8. | MP Diol | 0.5 | g | 5 Wt. % on total batch weight | Initial |
| 9. | OPA | 1.08 | g | 30 ppm as P | After Esterification |
| 10. | Potassium Titanium Oxide Oxalate Catalyst | 0.519 | g | 7 ppm | After Esterification |
| 11. | Tungsten Trioxide | 0.12 | g | 12 ppm | After Esterification |

TABLE 16

Properties of Amorphous and SSP Copolyester Resin

| PARAMETERS | AMORPHOUS | SSP |
|---|---|---|
| I.V. dL/g | 0.548 | 0.800 |
| L* | 76.1 | 80.9 |
| a* | −1.0 | −1.3 |
| b* | −5.9 | −2.4 |
| Tm ° C. | 227 | 226 |
| Tg ° C. | 73.0° C. | 73.1° C. |
| COOH, meq/kg | 23 | 11 |
| DEG wt. % | 1.25 | 1.29 |

EXAMPLE 9

Example 9 was repeated as described in Example-1 with the changes in recipe as given in Table-17 (20% PCRPET)

The required kg of IPA (~7 to 8% on PET calculated on the basis of 10 kg), MEG, and 2 kg PCRPET as flakes were taken in the Esterification reactor. Appropriate quantities of PTA and MEG for a 10 kg of PET batch were made into a paste and fed to the Esterification reactor. In the present examples 6.14 kg of PTA was added in the esterification reactor. The depolymerization of the PCRPET by chemical glycolysis using MEG was carried out at about 235° C. for about 60 minutes under 3.5 bar gauge pressure. After the depolymerization appropriate quantities of Cobalt Acetate, Red Toner powder, Blue Toner powder as Color improving additives, Nyacol consisting of 30% nano silica by weight in MEG as a suspension and stabilizer Irganox (2,6-Di-tert-butylphenol) were added to the esterification reactor. Esterification was carried out between 245° C. With 100% PCRPET there was no esterification process. After the completion of esterification heat stabilizer i.e. triethylphosphono acetate (TEPA) was added to the esterifier. After esterification prior to the transfer of the prepolymer formed to the poly reactor tungsten trioxide, a clear fast reheat (CFRH) additive was added and held for 5 minutes. The prepolymer with all the additives was transferred via a 20 micron filter to the polycondensation reactor or autoclave. Polymerization was conducted between 265 and 282° C. with a peak temperature of 280° C. to achieve the required I.V. in the melt. After reaching the required I.V. the amorphous co polyester resin melt was extruded out as strands and cut under water and collected as amorphous chips. These amorphous chips were dried and pre-crystallized before subjecting to solid state polymerization (SSP) for increasing the I.V. beyond ~0.55 dl/g obtained in the amorphous melt.

EXAMPLE 10

50% PCRPET

Example 10 was carried out as per the process described in Example 9, except that the 5 kg PCRPET and 3.6 kg of PTA were added in the esterification reactor and esterification reaction was carried out at 255° C.

EXAMPLE 11

100% PCRPET

Example 10 was carried out as per the process described in Example 9, except that the virgin PET was replaced with PCRPET. 9.20 kg of PCRPET was added in the esterification reactor and esterification reaction was carried out at 265° C.

Table 17 gives the details of the raw materials and additives for a typical batch as described in Examples 9, 10 and 11.

Table 18 gives the important properties of the amorphous and SSP chips of the PCRPET incorporated co polyester resin.

TABLE 17

Raw Materials and Additives for a 10 kg Batch Weight of Copolyester Resin containing PCRPET as described in Examples 9, 10 and 11.
Additives are based on 10 kg batch weight

| Sr. No. | Raw Materials/ Additives | Units | 20% PCRPET | 50% PCRPET | 100% PCRPET | Addition Point |
|---|---|---|---|---|---|---|
| 1. | PCRPET Flakes | Kg | 2.00 | 5.00 | 9.20 | Initial |
| 2. | PTA | Kg | 6.14 | 3.6 | — | Initial |
| 3. | IPA | Kg | 0.77 | 0.73 | 0.66 | Initial |
| 4. | MEG | Kg | 3.62 | 3.65 | 3.68 | Initial |
| 5. | Cobalt Acetate Powder as Co | Ppm | 40 | 50 | 60 | After Depolymerization |
| 6. | RT - Powder | Ppm | 1 | 1 | 1 | After Depolymerization |
| 7. | BT - Powder | Ppm | 0.75 | 0.75 | 0.75 | After Depolymerzation |
| 8. | Nyacol Silica | Ppm | 200 | 200 | 200 | After Depolymerization |
| 9. | Irganox (2,6-Di-tert-butylphenol) | Ppm | 300 | 300 | 300 | After Depolymerization |
| 10. | $Sb_2O_3$ catalyst as Sb | Ppm | 200 | 200 | — | After Esterification |
| 11. | TriethylphosphonoAcetate (TEPA) as P | Ppm | 35 | 45 | 55 | After Esterification |
| 12. | Tungsten Trioxide | Ppm | 12 | 12 | 12 | After Esterification |

TABLE 18

Properties of Amorphous and SSP Copolyester Resin Containing PCRPET

| PARAMETERS | AMORPHOUS | | | SSP | | |
|---|---|---|---|---|---|---|
| | 20% PCRPET | 50% PCRPET | 100% PCRPET | 20% PCRPET | 50% PCRPET | 100% PCRPET |
| I.V. dL/g | 0.59 | 0.57 | 0.58 | 0.81 | 0.81 | 0.79 |
| L* | 74 | 71 | 68 | 75.5 | 75.0 | 70.9 |
| a* | −1.7 | −2.3 | −2.7 | −1.7 | −2.1 | −1.9 |
| b* | −3.7 | −2.5 | −0.9 | −1.2 | −0.8 | 1.0 |
| Tm° C. | 226.8 | 228.5 | 227.8 | 226.2 | 226.0 | 224.0 |
| Tg° C. | 75.8 | 75.7 | 75.9 | 75.9° C. | 76.1 | 75.8 |
| COOH, meq/kg | 17 | 14 | 15 | 11 | 10 | 7 |
| DEG wt. % | 3.02 | 2.24 | 2.00 | 3.11 | 2.22 | 2.03 |
| IPA % | 8.0 | 7.9 | 8.1 | 8.0 | 8.0 | 8.1 |

EXAMPLE 12

The co polyester resins made as described above were converted to sheets by extrusion and their heat sealing characteristics by thermal, infrared and radio frequency (R.F) were measured and compared with a PVC heat seal sheet. The sheets in accordance with this invention exhibited good clarity and the weld strength test results measured at different temperatures and cycle times indicated good sealing strength.

The weld strength test results indicated that the heat sealing strength is more than adequate for commercial applications. It can also be inferred that PVC has lower weld strength though it seals at lower temperature.

Table-19 gives the details of heat seal strength for the film of the present invention, taking Example 2 as a typical recipe versus the PVC heat seal film.

TABLE 19

Heat Seal Strengths of the Copolyester
(Values within brackets are for PVC film)

| CYCLE TIME (sec) | Weld Strength, lbf 120° C. | Weld Strength, lbf 130° C. | Weld Strength, lbf 140° C. | Weld Strength, lbf 150° C. |
|---|---|---|---|---|
| 0.70 | 0.02 (0.00) | 0.53 (0.02) | 3.88 (9.85) | 6.09 (4.05) |
| 1.10 | 0.32 (0.17) | 5.25 (9.88) | 18.42 (10.11) | 18.10 (10.92) |
| 1.30 | 2.52 (3.08) | 5.29 (7.95) | 19.86 (6.07) | 17.94 (9.39) |
| 1.50 | 0.32 (0.23) | 10.48 (8.66) | 19.47 (5.78) | 13.98 (4.67) |

It can be seen that the heat seal strengths of the copolyesters, when compared to PVC, are higher and adequate even at a low heat seal temperature of 140° C. The copolyester resins in accordance with the present invention were also subjected to thermoforming and it was observed that the cycle times were nearly 50% less when compared to PVC.

While considerable emphasis has been placed herein on the specific structure of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A polymeric composition suitable for manufacturing heat scalable films or sheets comprising:
   a. polyethylene terephthalate (PET) in about 80% to 95% by mass of the total composition;
   b. a polymer additive for lowering the melting point of the composition selected from the group consisting of Polyethylene Naphthalate (PEN), Polytrimethylene Naphthalate (PTN), in-situ formed Polyethylene Naphthalate (PEN) and in situ formed Polytrimethylene Naphthalate (PTN) in about 20% to 5% by mass of the total composition;
   c. a nucleating agent in about 200 to 1500 ppm by mass of the composition;
   d. a polycondensation catalyst in about 30 to 300 ppm by mass of the composition;
   e. a clear fast reheat (CFRH) additive in about 10 to 30 ppm by macs of the composition;
   f. a color toner in about 0.75 to 25 ppm by mass of the composition; and
   g. a heat stabilizer in about 20 to 55 ppm by mass of the composition.

2. A polymeric composition as claimed in claim 1, wherein the polyester component contains 0 to 100% post consumer recycled Polyethylene Terephthalate (PCRPET).

3. A polymeric composition as claimed in claim 1, wherein the nucleating agent is at least one nucleating agent selected from the group consisting of Nyacol silica, Nano clay, sodium stearate, sodium benzoate, sodium acetate, potassium stearate, potassium benzoate, sorbitol based chemicals, micronized sodium benzoate, micronized potassium benzoate, micronized sodium stearate and micronized potassium stearate.

4. A polymeric composition as claimed in claim 1, wherein the nucleating agent is Nyacol Silica (Colloidal silica).

5. A polymeric composition as claimed in claim 1, wherein the nucleating agent is Nano Clay.

6. A polymeric composition as claimed in claim 1, wherein the nucleating agent is a mixture of Nyacol Silica (Colloidal silica) and Nano clay.

7. A polymeric composition as claimed in claim 1, wherein the polycondensation catalyst is at least one polycondensation-catalyst selected from the group consisting of antimony, titanium, manganese and germanium based compounds.

8. A polymeric composition as claimed in claim 1, wherein the polycondensation catalyst is antimony trioxide.

9. A polymeric composition as claimed in claim 1, wherein the polycondensation catalyst is potassium titanium oxide oxalate.

10. A polymeric composition as claimed in claim 1, wherein the polycondensation catalyst is Manganese acetate.

11. A polymeric composition as claimed in claim 1, wherein the polycondensation catalyst is Germanium dioxide.

12. A polymeric composition as claimed in claim 1, wherein the clear fast reheat (CFRH) additive is tungsten Trioxide.

13. A polymeric composition as claimed in claim 1, wherein the color toner is at least one color toner selected from the group consisting of cobalt acetate, red toner powder and Blue toner powder.

14. A polymeric composition as claimed in claim 1, wherein the heat stabilizer is at least one heat stabilizer selected from the group consisting of triethylphosphono acetate, orthophosphoric acid and 2,6-di-tert-butylphenol.

15. A polymeric composition as claimed in claim 1, wherein the antiblocking agent is at least one antiblocking agent selected from the group consisting of silica, zeolite and talc.

16. A resin composition as claimed in claim 1 making heat sealable film or sheet.

17. A heat sealable film or sheet having a polymeric composition as claimed in claim 1.

18. A heat, film or sheet made from the composition as claimed in claim 16, said film being sealable by thermal, pressure, ultrasonic or radio frequency methods.

19. A method for making copolyester resin meant for manufacture of heat sealable films or sheets comprises the following steps:
   a. mixing virgin terephthalic acid, monoethylene glycol in paste optionally with PCRPET, and isophthalic acid in an esterification reactor and adding nucleating agent, polycondensation catalyst, color toners and beat stabilizers;
   b. carrying out the esterification reaction at a temperature between 245 and 265° C. to obtain a prepolymer;
   c. adding clear fast reheat (CFR)) additive to the prepolymer;
   d. transferring an esterified prepolymer to the polyreactor;
   e. adding a polymer additive for lowering the melting point of the composition selected from the group consisting of Polyethylene Naphthalate (PEN), Polytrimethylene Naphthalate (PTN), in-situ formed Polyethylene Naphthalate (PEN) and in-situ formed Polytrimethylene Naphthalate (PTN);
   f. subjecting the prepolymer cont&ining the polymer additive to polycondensation at a temperature of 265 to 284° C. to obtain a molten amorphous polymer;
   g. extruding molten amorphous polymer to form chips;
   h, drying and pre-crystallizing the amorphous chips; and
   i. subjecting the resultant chips to solid state polymerisation to attain an I.V. greater than 0.55 dL/g.

20. The method as claimed in claim 17, wherein depolymerized PCRPET is used.

21. The method as claimed in claim 18, wherein the depolymerized PCRPET is prepared by depolymerizion of PCRPET with Monoethylene Glycol at a temperature of 235° C. for about 60 min. under 3.5 bar gauge pressure.

22. The method for making heat sealable films or sheets comprising the step of subjecting said copolyester composition as claimed in claim 1 to extrusion to form heat sealable films or sheets.

23. The heat sealable top layer film or sheet for sealing containers of thermoformed CPET made in accordance with the process of claim 19.

* * * * *